US007291277B2

(12) United States Patent
Walczyk et al.

(10) Patent No.: US 7,291,277 B2
(45) Date of Patent: Nov. 6, 2007

(54) METHOD AND DEVICE FOR CLEANING THE FOUNTAIN SOLUTION OF A PRINTING PRESS

(75) Inventors: Christian Walczyk, Münster (DE); Christian Brüggemann, Rheda-Wiedenbrück (DE); Jürgen Mackel, Oelde (DE)

(73) Assignees: Technotrans AG, Sassenberg (DE); Westfalia Separator GmbH, Oelde (DE)

( * ) Notice: Subject to any disclaimer, the term of this patent is extended or adjusted under 35 U.S.C. 154(b) by 0 days.

(21) Appl. No.: 11/117,072

(22) Filed: Apr. 28, 2005

(65) Prior Publication Data

US 2006/0005724 A1 Jan. 12, 2006

(30) Foreign Application Priority Data

Apr. 30, 2004 (DE) ..................... 10 2004 021 508

(51) Int. Cl.
*B01D 21/00* (2006.01)

(52) U.S. Cl. ...................... 210/787; 210/800; 210/804; 210/248; 210/532.1; 210/540; 101/148; 101/364

(58) Field of Classification Search ................ 210/800, 210/803, 805
See application file for complete search history.

(56) References Cited

U.S. PATENT DOCUMENTS

| | | | | | |
|---|---|---|---|---|---|
| 2,389,730 | A | * | 11/1945 | Iler | 101/147 |
| 3,896,730 | A | * | 7/1975 | Garrett et al. | 101/425 |
| 3,949,668 | A | * | 4/1976 | Smith, Jr. | 101/148 |
| 3,959,129 | A | * | 5/1976 | White et al. | 210/667 |
| 4,009,657 | A | * | 3/1977 | Bonanno et al. | 101/157 |
| 4,151,854 | A | * | 5/1979 | Patsko | 137/3 |
| 4,179,019 | A | * | 12/1979 | Danziger | 196/46.1 |
| 4,384,523 | A | * | 5/1983 | Ryan | 101/210 |
| 4,391,638 | A | * | 7/1983 | Fusco et al. | 106/31.64 |
| 4,565,638 | A | * | 1/1986 | Zucker | 210/774 |
| 4,574,695 | A | * | 3/1986 | Ryan | 101/148 |
| 4,608,158 | A | * | 8/1986 | Ghisalberti et al. | 210/96.1 |
| 4,693,821 | A | | 9/1987 | Goronszy et al. | |
| 4,738,785 | A | * | 4/1988 | Langston et al. | 210/738 |
| 4,754,779 | A | * | 7/1988 | Juhasz | 137/565.33 |
| 4,778,604 | A | * | 10/1988 | Leonard et al. | 210/664 |
| 4,818,284 | A | * | 4/1989 | McKelvey | 106/31.32 |
| 4,874,515 | A | * | 10/1989 | McKelvey | 210/360.1 |
| 5,017,291 | A | * | 5/1991 | Semler et al. | 210/641 |
| 5,124,736 | A | * | 6/1992 | Yamamoto et al. | 396/631 |
| 5,177,975 | A | * | 1/1993 | Mertens | 62/64 |
| 5,181,467 | A | * | 1/1993 | Takekoshi | 101/147 |

(Continued)

FOREIGN PATENT DOCUMENTS

DE 197 38 049 3/1999

(Continued)

*Primary Examiner*—Robert James Popovics
(74) *Attorney, Agent, or Firm*—Richard M. Goldberg

(57) ABSTRACT

A method for cleaning the fountain solution of a printing press with an automatically emptying separator (16), separates the dirt particles and oil residues from fountain solution and supplies them, as a mixture of dirt and fountain solution, to a dirt and fountain solution container (24) and passes the remaining fountain solution into a fountain solution storage tank (20). The dirt and fountain solution mixture in the dirt and fountain solution mixture container (24) is caused to settle in layers and the layer, containing the fountain solution, is transferred by an overflow (26) in to the fountain solution storage tank (20).

10 Claims, 1 Drawing Sheet

U.S. PATENT DOCUMENTS 5,200,094 A * 4/1993 Hill et al. .................. 210/768
5,201,943 A * 4/1993 Monnerat ................ 106/31.13
5,344,573 A * 9/1994 Hill et al. .................. 210/768
5,415,091 A * 5/1995 Junghans .................... 101/147
5,489,379 A * 2/1996 Meenan et al. ............. 210/167
5,505,863 A * 4/1996 Danon et al. ............... 210/774
5,622,620 A * 4/1997 Meenan et al. ............. 210/130
5,628,914 A * 5/1997 Prasil ........................ 210/770
5,734,944 A * 3/1998 Seeley et al. ............... 396/565
5,811,224 A * 9/1998 Seeley et al. ............... 430/399
5,828,923 A * 10/1998 Harabin et al. ............. 396/626
6,126,336 A * 10/2000 Ferrante ..................... 396/565
6,224,273 B1 * 5/2001 Ferrante ..................... 396/565
6,247,856 B1 * 6/2001 Shibano et al. ............. 396/565
6,293,198 B1 * 9/2001 Mizuno ...................... 101/483
6,855,487 B2 * 2/2005 Fiebag et al. ............... 430/399
6,908,558 B2 * 6/2005 Stinson et al. .............. 210/660
7,087,159 B2 * 8/2006 Stinson et al. ......... 210/167.31
7,112,282 B2 * 9/2006 Stinson et al. .............. 210/663
2004/0182796 A1 * 9/2004 Stinson et al. .............. 210/806
2005/0006294 A1 * 1/2005 Stinson et al. .............. 210/259
2005/0242019 A1 * 11/2005 Stinson et al. .............. 210/259
2005/0252860 A1 * 11/2005 Stinson et al. .............. 210/659
2005/0279691 A1 * 12/2005 Stinson et al. .............. 210/259
2005/0284804 A1 * 12/2005 Stinson et al. .............. 210/259
2006/0005724 A1 * 1/2006 Walczyk et al. ............ 101/425

FOREIGN PATENT DOCUMENTS

DE 199 55 624 5/2001
JP 2002059531 2/2002
WO WO 01/28776 4/2001

* cited by examiner

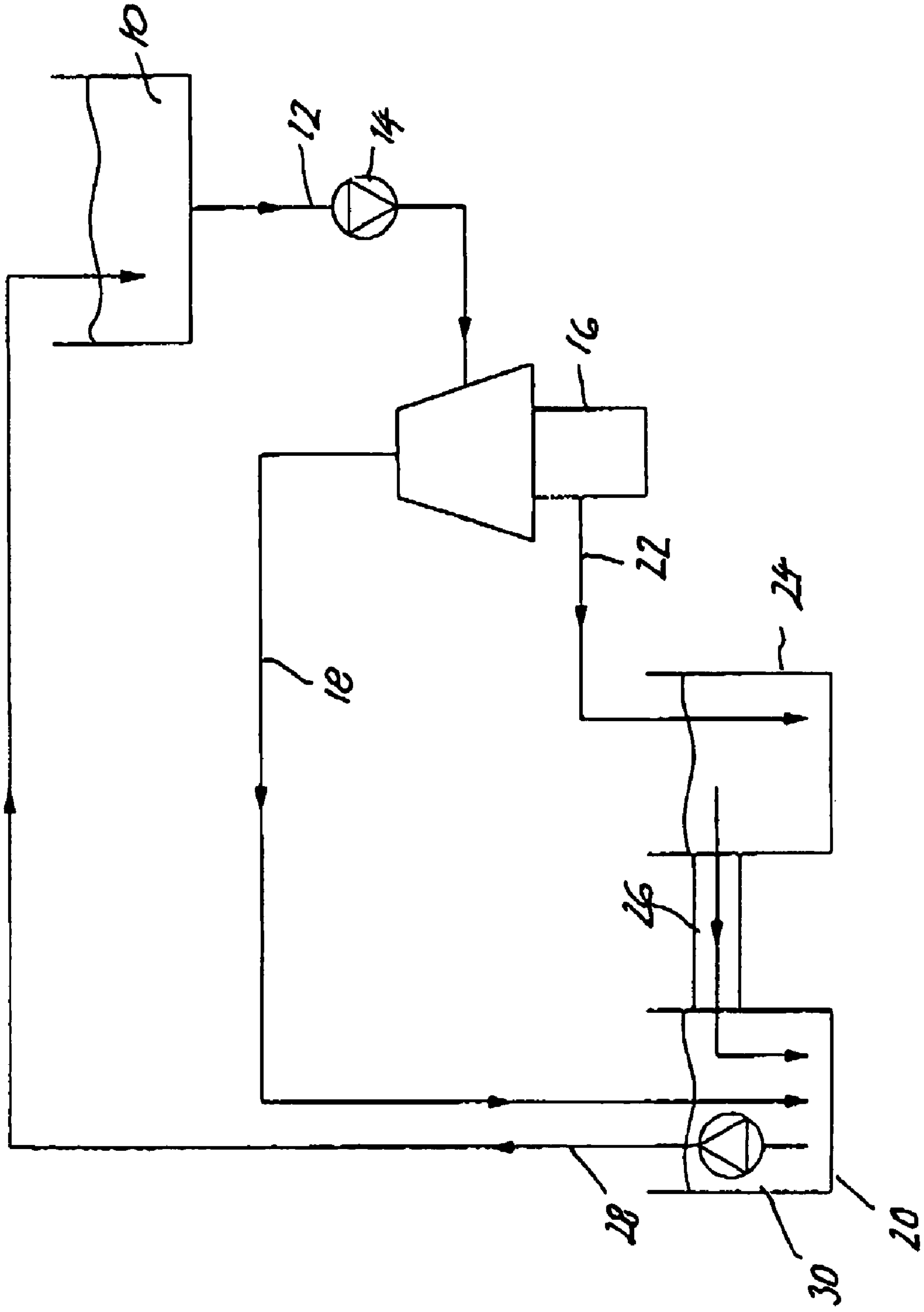
10
12
14
16
18
20
22
24
26
28
30

METHOD AND DEVICE FOR CLEANING THE FOUNTAIN SOLUTION OF A PRINTING PRESS

BACKGROUND OF THE INVENTION

The invention relates to a method for cleaning the fountain solution of a printing press with an automatically emptying separator, which separates the dirt particles and oil residues from the fountain solution and supplies them, as a mixture of dirt and fountain solution, to a dirt and fountain solution container and passes the remaining fountain solution into a fountain solution storage container.

In offset printing, the fountain solution serves to moisten the rollers, while they take up and transfer printing ink. Generally, the fountain solution consists essentially of water with an addition of alcohol and further additives. During the printing process, the fountain solution is exposed increasingly to contamination by taking up ink residues, dust, etc. On the other hand, every effort is made to re-use the fountain solution, since the water consumption and the costs of the additives, as well as, on the other hand, the disposal costs, can be kept within limits in this way. For this reason, fountain solution systems are cycled in many cases. Generally, the fountain solution is filtered or otherwise subjected to cleaning processes after use and then returned to a fountain solution tank. At the same time, the ratio, in which the water and additives are mixed, can also be adjusted once again. The cleaning of the fountain solution by a centrifugal separator, in which the dirt particles are separated from the fountain solution, is also known. Separators of this type, as embodiments with self-emptying facilities, also exist (DE 199 55 624 A1).

The separation of the mixture of fountain solution and dirt particles in the separator, of course, results in a product, which, as before, contains a relatively high proportion of reusable fountain solution.

An intensification of the cleaning process was attained with the help of filters, which are frequently used in practice. Filters are used in the form of filter mats, belt filters, filter bags, etc.

These filter materials represent consumable materials and, because they have to be purchased as well as, later on, disposed of, are associated with costs, especially also because of the need to have the filter materials exchanged regularly by the use of personnel.

SUMMARY OF THE INVENTION

It is therefore an object of the invention to provide a method and device of the above type, which permits a high degree of separation of fountain solution from dirt particles without the use of filter materials.

This objective is accomplished in the inventive method owing to the fact that the mixture of dirt and fountain solution in the dirt and fountain solution container is allowed to settle into layers and that the layer, containing the fountain solution, is transferred by an overflow in to the fountain solution storage container.

Because of the different density relationships, the dirt particles usually settle at the bottom of the dirt and fountain solution container, the oil residues form the upper layer and the still usable fountain solution forms the middle layer. By a suitable arrangement of an overflow, the middle layer can be drawn off and, with that, separated from the lower dirt particles layer and the upper oil layer. For a different distribution of the layers, the overflow can be used correspondingly differently.

Preferably, an overflow dam of adjustable height is provided at the top and optionally also at the bottom. It can be adjusted so that the dirt particles at the bottom and the oil residues floating at the top can be retained.

The inventive device is characterized in that the dirt and fountain solution container is connected with the fountain solution storage container by an overflow, which starts out from the layer of the dirt and fountain solution container containing the fountain solution. The height of the overflow dam, breaking the surface from above, can be varied. It is also possible to provide an adjustable overflow dam, which can be raised from below.

BRIEF DESCRIPTION OF THE DRAWINGS

In the following, preferred examples of the invention are described in greater detail by means of the attached drawing.

The only FIGURE is a diagrammatic circuit diagram to explain the course of the inventive method.

DETAILED DESCRIPTION

In the drawing, the fountain solution tank is labeled 10. From this fountain solution tank 10, fountain solution is transported in a manner, which is not shown, to the associated printing mechanism of the printing press and spent fountain solution is passed back. These details are not shown. Independently thereof, fountain solution is drawn of from the fountain solution tank 10 over a pipeline 12 with the help of a pump 14 and supplied to a centrifugal separator 16. This separator is self-emptying. It serves for the further separation of fountain solution from dirt particulates. Over a pipeline 18, the separator delivers largely purified fountain solution to a fountain solution storage tank 20. On the other hand, a mixture of dirt particles and fountain solution is passed by the separator 16 over a pipeline 22 into a dirt and fountain solution container 24.

The dirt and fountain solution container 24 is connected by an overflow 26, which is shown only diagrammatically in the drawing, with the fountain solution storage tank 20. The overflow 26 starts out from the middle region of the dirt and fountain solution containing 24, so that dirt particles in the dirt and fountain solution container 24 sink to the bottom and oil residues can float to the top. On the other hand, largely pure fountain solution is available at mid height. This layer of fountain solution may be drawn off over the overflow 26, which is attached at mid height. Moreover, an overflow dam may protrude from above and optionally also from below into the overflow. This overflow dam may be adjustable in the vertical direction, so that, like a shutter, it permits only the layer of essentially pure fountain solution to pass.

A pipeline 28, in which there is a pump 30, starts out from the fountain solution storage tank 20. The purified fountain solution can be pumped over the pipeline 28 from the fountain solution storage tank 20 the fountain solution tank 10.

As a result of the arrangement of the two tanks 20, 24 with the overflow 26, which connects them, a further cleaning step is available for cleaning the fountain solution without having to use additional filter units.

The cost of disposing of spent separators is reduced.

The invention claimed is:

1. Method for cleaning the fountain solution of a printing press, comprising the steps of:

separating dirt particles and oil residues from fountain solution with an automatically emptying separator, supplying a mixture of separated dirt particles and oil residues and a portion of the fountain solution, to a dirt and fountain solution container, passing remaining separated fountain solution into a fountain solution storage tank, causing the dirt particles, oil residues and fountain solution mixture in the dirt and fountain solution mixture container to separate in layers with a lower layer being the dirt particles, an upper layer being the oil residue and a middle layer between the lower and upper layers being the fountain solution, and transferring only the middle layer containing the fountain solution by an overflow stream into the fountain solution storage tank.

2. The method of claim 1, further comprising the step of inserting an overflow dam, from above, in the overflow stream.

3. The method of claim 2, wherein a height of the overflow dam is adjustable.

4. The method of claim 1, further comprising the step of providing an overflow dam, which can be raised from below, in the dirt and fountain solution container.

5. The method of claim 1, wherein the step of separating uses a centrifugal separator.

6. Device for cleaning the fountain solution of a printing press, comprising:

a dirt and fountain solution container which separates the dirt particles, oil residues and fountain solution mixture in layers with a lower layer being the dirt particles, an upper layer being the oil residues and a middle layer between the lower and upper layers being the fountain solution, a fountain solution storage tank, an automatically emptying separator, which separates dirt particles and oil residues from fountain solution and supplies a mixture of said separated dirt particles, oil residues and a portion of said fountain solution, to the dirt and fountain solution container and passes remaining separated fountain solution into the fountain solution storage tank, and an overflow which connects the dirt and fountain solution container with the fountain solution storage tank and which transfers only the fountain solution from the middle layer of the dirt and fountain solution container to the fountain solution storage tank.

7. The device of claim 6, further comprising an overflow dam that dips from above into a flow path of the overflow.

8. The device of claim 7, wherein a height of the overflow dam is adjustable.

9. The device of claim 6, further comprising an adjustable overflow dam, which can be raised from below, in a flow path of the overflow.

10. The device of claim 6, wherein the separator includes a centrifugal separator.

* * * * *